Patented June 3, 1952

2,599,445

UNITED STATES PATENT OFFICE 2,599,445

DENTAL PREPARATION AND METHOD OF MAKING IT

Elliot Gordon, Norwood, Mass., assignor to Rower Dental Mfg. Corp., Boston, Mass., a corporation No Drawing. Application March 30, 1950, Serial No. 153,003

4 Claims. (Cl. 106—35)

This invention relates to a dental preparation that includes a calcium compound or derivative.

A calcium compound such as calcium salts is used by dentists in cavity lining and pulp capping to promote healing of damaged pulp tissue and to stimulate the development of secondary dentin in patients' teeth. However, since the calcium compound is in powder form the dentist has to spend time mixing it with water or other fluid to get the correct consistency for use, which takes the time of both the patient and dentist.

My principal object is to provide a vehicle for said calcium compound whereby the latter is moistened and prepared in paste form so that it remains moist, at all times ready for use by the dentist.

Another object is to provide a new method of preparing this dental preparation whereby said calcium compound is moistened and formed into a paste in an effective and efficient manner.

In practicing my invention I first mix a hydrocarbon derivative of cellulose, such as methyl cellulose, in water, using by weight, not more than ten per cent of said methyl cellulose, with the balance of water. The mixture is stirred, or the methyl cellulose may otherwise be dissolved in the water, as, for instance, by boiling the mixture. When dispersion of the methyl cellulose in the water has been accomplished the temperature of the mixture should be lowered as by placing it in a refrigerator or otherwise reducing it. This reduction may be as low as 4 degrees C. to produce a true solution. This could be attained merely by keeping the dissolved methyl cellulose concentrate at an ordinary temperature for a few days.

Into this solution I add, as a predominant part of this preparation, calcium compound such as calcium hydroxide in finely divided form of a weight approximately equal to that of said methyl cellulose solution, or sufficient to produce a paste, and then it is thoroughly mixed as by milling until a paste is made. Quicklime may be used or various calcium derivatives. The methyl cellulose constitutes from 2 to 5% by weight of said paste in the the finished product.

Various calcium compounds and calcium derivatives, both organic and inorganic, may be used, such as calcium carbonate, calcium fluoride, calcium phosphate and said calcium hydroxide.

In conclusion, it will be understood that various changes may be made in the ingredients and proportions specified without departing from the spirit and scope of my invention, hence I do not intend to be limited to details hereinbefore described as they may be specifically included in the claims.

What I claim is:

1. A dental preparation for cavity lining and pulp capping consisting essentially of water soluble methyl cellulose, water, and calcium hydroxide mixed together and in the form of a paste, said methyl cellulose constituting 2 to 5% by weight of said preparation.

2. A dental preparation for cavity lining and pulp capping consisting essentially of calcium hydroxide as the predominant part, water, and at least 2% by weight of water soluble methyl cellulose, the latter being less by weight than either said calcium hydroxide or water.

3. The method of making a dental preparation for cavity lining and pulp capping consisting essentially of mixing water soluble methyl cellulose and water until the methyl cellulose is dissolved therein, the methyl cellulose constituting 4 to 10% by weight of the solution, and thereafter adding calcium hydroxide thereto in sufficient quantity by weight to make a paste, and mixing thoroughly until a paste is thereby formed.

4. The method of making a dental preparation for cavity lining and pulp capping consisting essentially of mixing water soluble methyl cellulose and water until the methyl cellulose is dissolved therein, the methyl cellulose constituting 4 to 10% by weight of the solution, then lowering the temperature of the mix and adding calcium hydroxide thereto in sufficient quantity by weight to make a paste, and mixing thoroughly until a paste is thereby formed.

ELLIOT GORDON.

REFERENCES CITED

The following references are of record in the file of this patent:

UNITED STATES PATENTS

| Number | Name | Date |
|---|---|---|
| 2,432,971 | Ruthman | Dec. 16, 1947 |
| 2,476,306 | King | July 19, 1949 |